(12) United States Patent
Van De Ven et al.

(10) Patent No.: US 9,599,291 B2
(45) Date of Patent: Mar. 21, 2017

(54) SOLID STATE LIGHT SOURCE EMITTING WARM LIGHT WITH HIGH CRI

(71) Applicant: CREE, INC., Durham, NC (US)

(72) Inventors: Antony Van De Ven, Sai Kung (HK); Gerald Negley, Chapel Hill, NC (US); Paul Kenneth Pickard, Pasadena, CA (US)

(73) Assignee: CREE, INC., Durham, NC (US)

( * ) Notice: Subject to any disclaimer, the term of this patent is extended or adjusted under 35 U.S.C. 154(b) by 65 days.

(21) Appl. No.: 14/188,094

(22) Filed: Feb. 24, 2014

(65) Prior Publication Data

US 2014/0168989 A1    Jun. 19, 2014

Related U.S. Application Data

(63) Continuation of application No. 12/794,491, filed on Jun. 4, 2010, now Pat. No. 8,684,559.

(51) Int. Cl.
*F21K 99/00* (2016.01)
*F21V 5/00* (2015.01)
(Continued)

(52) U.S. Cl.
CPC ............. *F21K 9/50* (2013.01); *F21K 9/233* (2016.08); *F21K 9/60* (2016.08); *F21V 5/002* (2013.01); *F21V 7/0025* (2013.01); *F21V 9/00* (2013.01); *F21V 9/08* (2013.01); *F21V 11/06* (2013.01); *F21V 13/04* (2013.01); *F21V 13/08* (2013.01);
(Continued)

(58) Field of Classification Search
CPC . F21K 9/137; F21K 9/50; F21V 5/002; F21V 9/00; F21V 13/08; F21V 7/0025; F21V 9/08; F21V 13/04; F21V 13/14; F21V 11/06; F21V 31/04; F21V 9/083;
(Continued)

(56) References Cited

U.S. PATENT DOCUMENTS 4,120,026 A    10/1978    Tsuchihashi et al.
4,710,699 A    12/1987    Miyamoto
(Continued)

FOREIGN PATENT DOCUMENTS

DE    39 16 875    12/1990
DE    42 28 895    3/1994
(Continued)

OTHER PUBLICATIONS

U.S. Appl. No. 60/792,859, filed Apr. 18, 2006, Van De Ven.
(Continued)

*Primary Examiner* — Bao Q Truong
(74) *Attorney, Agent, or Firm* — Koppel, Patrick, Heybl & Philpott

(57) ABSTRACT

Solid state light sources, lighting devices and lamps arranged to provide emission with a warm temperature and high CRI. One embodiment of a solid state lighting device according to the present invention comprises a light emitting diode (LED) device capable of emitting light in an emission spectrum. A filter arranged so that at least some light from the LED light source passes through it, with the filter filtering at least some of one or more portions of the light source emission spectrum. The resulting light source light has a different temperature but substantially the same CRI after passing through the filter.

33 Claims, 9 Drawing Sheets

(51) Int. Cl.

| | | |
|---|---|---|
| *F21V 7/00* | (2006.01) | |
| *F21V 9/00* | (2015.01) | |
| *F21V 9/08* | (2006.01) | |
| *F21V 11/06* | (2006.01) | |
| *F21V 13/04* | (2006.01) | |
| *F21V 13/08* | (2006.01) | |
| *F21V 13/14* | (2006.01) | |
| *F21V 31/04* | (2006.01) | |
| *H05B 33/08* | (2006.01) | |
| *G02B 5/20* | (2006.01) | |
| *F21Y 101/00* | (2016.01) | |

(52) U.S. Cl.
CPC ............. *F21V 13/14* (2013.01); *F21V 31/04* (2013.01); *H05B 33/0857* (2013.01); *F21Y 2101/00* (2013.01); *G02B 5/20* (2013.01)

(58) Field of Classification Search
CPC ... F21V 9/10; H05B 33/0857; F21Y 2101/02; F21Y 2101/00; F21Y 2115/10; G02B 5/20
See application file for complete search history.

(56) References Cited

U.S. PATENT DOCUMENTS

| | | |
|---|---|---|
| 5,477,436 A | 12/1995 | Bertling et al. |
| 5,803,579 A | 9/1998 | Turnbull et al. ............... 362/516 |
| 5,851,063 A | 12/1998 | Doughty et al. |
| 5,962,971 A | 10/1999 | Chen |
| 5,998,925 A | 12/1999 | Shimizu et al. |
| 6,066,861 A | 5/2000 | Hohn et al. |
| 6,069,440 A | 5/2000 | Shimizu et al. |
| 6,084,250 A | 7/2000 | Justel et al. |
| 6,132,072 A | 10/2000 | Turnbull et al. |
| 6,153,971 A | 11/2000 | Shimizu |
| 6,163,038 A | 12/2000 | Chen et al. |
| 6,212,213 B1 | 4/2001 | Weber et al. |
| 6,234,648 B1 | 5/2001 | Borner et al. |
| 6,245,259 B1 | 6/2001 | Hohn et al. |
| 6,252,254 B1 | 6/2001 | Soules et al. |
| 6,255,670 B1 | 7/2001 | Srivastava et al. |
| 6,294,800 B1 | 9/2001 | Duggal et al. |
| 6,319,425 B1 | 11/2001 | Tasaki et al. |
| 6,337,536 B1 | 1/2002 | Matsubara et al. |
| 6,373,188 B1 | 4/2002 | Johnson et al. |
| 6,396,081 B1 | 5/2002 | Tews et al. |
| 6,429,583 B1 | 8/2002 | Levinson et al. |
| 6,441,558 B1 | 8/2002 | Muthu et al. |
| 6,469,322 B1 | 10/2002 | Srivastava et al. |
| 6,480,299 B1 | 11/2002 | Drakopoulos et al. |
| 6,501,100 B1 | 12/2002 | Srivastava et al. |
| 6,501,102 B2 | 12/2002 | Mueller-Mach et al. |
| 6,504,179 B1 | 1/2003 | Ellens et al. |
| 6,504,301 B1 | 1/2003 | Lowery |
| 6,509,651 B1 | 1/2003 | Matsubara et al. |
| 6,513,949 B1 | 2/2003 | Marshall et al. |
| 6,538,371 B1 | 3/2003 | Duggal et al. |
| 6,547,249 B2 | 4/2003 | Collins, III et al. |
| 6,550,949 B1 | 4/2003 | Bauer et al. |
| 6,552,495 B1 | 4/2003 | Chang |
| 6,576,930 B2 | 6/2003 | Reeh et al. |
| 6,577,073 B2 | 6/2003 | Shimizu et al. |
| 6,600,175 B1 | 7/2003 | Baretz et al. |
| 6,600,324 B2 | 7/2003 | St. Germain |
| 6,608,332 B2 | 8/2003 | Shimizu et al. |
| 6,614,179 B1 | 9/2003 | Shimizu et al. |
| 6,616,862 B2 | 9/2003 | Srivastava et al. |
| 6,624,638 B2 | 9/2003 | St. Germain |
| 6,635,503 B2 | 10/2003 | Andrews et al. |
| 6,636,003 B2 | 10/2003 | Rahm et al. |
| 6,642,666 B1 | 11/2003 | St. Germain |
| 6,685,852 B2 | 2/2004 | Setlur et al. |
| 6,692,136 B2 | 2/2004 | Marshall et al. |
| 6,703,173 B2 | 3/2004 | Lu et al. |
| 6,737,801 B2 | 5/2004 | Ragle |
| 6,744,194 B2 | 6/2004 | Fukasawa et al. |
| 6,762,563 B2 | 7/2004 | St. Germain et al. |
| 6,784,463 B2 | 8/2004 | Camras et al. |
| 6,817,735 B2 | 11/2004 | Shimizu et al. |
| 6,841,804 B1 | 1/2005 | Chen et al. |
| 6,853,010 B2 | 2/2005 | Slater, Jr. et al. |
| 6,882,101 B2 | 4/2005 | Ragle |
| 6,885,035 B2 | 4/2005 | Bhat et al. |
| 6,914,267 B2 | 7/2005 | Fukasawa et al. |
| 6,936,857 B2 | 8/2005 | Doxsee et al. |
| 6,957,899 B2 | 10/2005 | Jiang et al. |
| 6,967,116 B2 | 11/2005 | Negley |
| 7,005,679 B2 | 2/2006 | Tarsa et al. |
| 7,008,078 B2 | 3/2006 | Shimizu et al. |
| 7,009,199 B2 | 3/2006 | Hall |
| 7,009,343 B2 | 3/2006 | Lim et al. |
| 7,014,336 B1 | 3/2006 | Ducharme et al. |
| 7,023,019 B2 | 4/2006 | Maeda et al. |
| 7,095,056 B2 | 8/2006 | Vitta et al. |
| 7,125,143 B2 | 10/2006 | Hacker |
| 7,135,664 B2 | 11/2006 | Vornsand et al. |
| 7,141,442 B2 | 11/2006 | Sano |
| 7,207,691 B2 | 4/2007 | Lee et al. ..................... 362/231 |
| 7,213,940 B1 | 5/2007 | Van de Ven .................. 362/231 |
| 7,213,942 B2 | 5/2007 | Jiang et al. |
| 7,217,583 B2 | 5/2007 | Negley et al. |
| 7,221,044 B2 | 5/2007 | Fan et al. |
| 7,250,715 B2 | 7/2007 | Mueller et al. |
| 7,256,557 B2 | 8/2007 | Lim et al. |
| 7,262,439 B2 | 8/2007 | Radkov et al. |
| 7,278,760 B2 | 10/2007 | Heuser et al. |
| 7,358,954 B2 | 4/2008 | Negley et al. |
| 7,365,485 B2 | 4/2008 | Fukasawa et al. |
| 7,387,405 B2 | 6/2008 | Ducharme et al. |
| 7,417,259 B2 | 8/2008 | Sakai et al. |
| 7,422,504 B2 | 9/2008 | Maeda et al. |
| 7,453,195 B2 | 11/2008 | Radkov |
| 7,473,934 B2 | 1/2009 | Nagai et al. |
| 7,564,180 B2 | 7/2009 | Brandes ....................... 313/501 |
| 8,104,931 B2 * | 1/2012 | Lai ............... F21V 5/02 362/277 |
| 8,169,135 B2 | 5/2012 | Zhai et al. ..................... 313/501 |
| 8,201,966 B2 * | 6/2012 | Hall ................ A61B 19/52 362/231 |
| 8,721,123 B2 * | 5/2014 | Calmes ............... F21V 9/10 359/890 |
| 2003/0030063 A1 | 2/2003 | Sosnlak et al. |
| 2003/0042908 A1 | 3/2003 | St. Germain |
| 2003/0089918 A1 | 5/2003 | Hiller et al. |
| 2004/0046178 A1 | 3/2004 | Sano |
| 2004/0105264 A1 | 6/2004 | Spero |
| 2004/0264193 A1 | 12/2004 | Okumura |
| 2005/0030744 A1 | 2/2005 | Ducharme et al. |
| 2006/0012989 A1 | 1/2006 | Lee |
| 2006/0022582 A1 | 2/2006 | Radkov |
| 2006/0105482 A1 | 5/2006 | Alferink et al. |
| 2006/0113548 A1 | 6/2006 | Chen et al. |
| 2006/0138435 A1 | 6/2006 | Tarsa et al. |
| 2006/0181192 A1 | 8/2006 | Radkov et al. |
| 2006/0245184 A1 | 11/2006 | Galli |
| 2007/0001188 A1 | 1/2007 | Lee |
| 2007/0051966 A1 | 3/2007 | Hagashi et al. |
| 2007/0090381 A1 | 4/2007 | Otsuka et al. |
| 2007/0139920 A1 | 6/2007 | Van De Ven et al. |
| 2007/0139923 A1 | 6/2007 | Negley et al. |
| 2007/0170447 A1 | 7/2007 | Negley et al. |
| 2007/0171145 A1 | 7/2007 | Coleman et al. |
| 2007/0202623 A1 | 8/2007 | Gao et al. |
| 2007/0223219 A1 | 9/2007 | Medendorp, Jr. et al. |
| 2007/0236911 A1 | 10/2007 | Negley |
| 2007/0263393 A1 | 11/2007 | Van De Ven |
| 2007/0267983 A1 | 11/2007 | Van De Ven et al. |
| 2007/0274063 A1 | 11/2007 | Negley |
| 2007/0274080 A1 | 11/2007 | Negley et al. |
| 2007/0276606 A1 | 11/2007 | Radkov et al. |
| 2007/0278503 A1 | 12/2007 | Van De Ven et al. |
| 2007/0278934 A1 | 12/2007 | Van De Ven et al. |

(56) References Cited

U.S. PATENT DOCUMENTS

| | | |
|---|---|---|
| 2007/0279440 A1 | 12/2007 | Negley |
| 2007/0279903 A1 | 12/2007 | Negley et al. |
| 2007/0280624 A1 | 12/2007 | Negley et al. |
| 2008/0084685 A1 | 4/2008 | Van De Ven et al. |
| 2008/0084700 A1 | 4/2008 | Van De Ven |
| 2008/0084701 A1 | 4/2008 | Van De Ven et al. |
| 2008/0088248 A1 | 4/2008 | Myers |
| 2008/0089053 A1 | 4/2008 | Negley |
| 2008/0106895 A1 | 5/2008 | Van de Ven et al. |
| 2008/0106907 A1 | 5/2008 | Trott et al. |
| 2008/0112168 A1 | 5/2008 | Pickard |
| 2008/0112170 A1 | 5/2008 | Trott et al. |
| 2008/0112183 A1 | 5/2008 | Negley |
| 2008/0130265 A1 | 6/2008 | Negley et al. |
| 2008/0130285 A1 | 6/2008 | Negley et al. |
| 2008/0130298 A1 | 6/2008 | Negley et al. |
| 2008/0136313 A1 | 6/2008 | Van De Ven et al. |
| 2008/0137347 A1 | 6/2008 | Trott et al. |
| 2008/0179602 A1 | 7/2008 | Negley et al. |
| 2008/0211416 A1 | 9/2008 | Negley et al. |
| 2008/0259589 A1 | 10/2008 | Van De Ven |
| 2008/0278928 A1 | 11/2008 | Van De Ven et al. |
| 2008/0278940 A1 | 11/2008 | Van De Ven et al. |
| 2008/0278950 A1 | 11/2008 | Pickard et al. |
| 2008/0278952 A1 | 11/2008 | Trott et al. |
| 2008/0304260 A1 | 12/2008 | Van De Ven et al. |
| 2008/0304261 A1 | 12/2008 | Van De Ven et al. |
| 2008/0304269 A1 | 12/2008 | Pickard et al. |
| 2008/0309255 A1 | 12/2008 | Myers et al. |
| 2008/0310154 A1 | 12/2008 | Van De Ven et al. |
| 2008/0310158 A1 | 12/2008 | Harbers |
| 2009/0034284 A1* | 2/2009 | Li .................. G03B 33/06 362/554 |
| 2009/0050907 A1 | 2/2009 | Yuan et al. |
| 2009/0108269 A1 | 4/2009 | Negley et al. |
| 2009/0160363 A1 | 6/2009 | Negley et al. |
| 2009/0161356 A1 | 6/2009 | Negley et al. |
| 2009/0184616 A1 | 7/2009 | Van De Ven et al. |
| 2009/0184666 A1 | 7/2009 | Myers et al. |
| 2009/0246895 A1 | 10/2009 | You et al. |

FOREIGN PATENT DOCUMENTS

| | | |
|---|---|---|
| DE | 103 35 077 | 3/2005 |
| EP | 0 838 866 A2 | 4/1998 |
| EP | 0 971 421 A2 | 1/2000 |
| EP | 1 024 399 A1 | 8/2000 |
| EP | 1 160 883 A2 | 12/2001 |
| EP | 1 193 772 A2 | 4/2002 |
| EP | 1 367 655 A1 | 12/2003 |
| EP | 1 462 711 A1 | 12/2004 |
| EP | 1 566 848 A2 | 8/2005 |
| EP | 1 571 715 A1 | 9/2005 |
| EP | 1 760 795 A2 | 3/2007 |
| EP | 1 850 383 A1 | 10/2007 |
| JP | 10-163535 | 6/1998 |
| JP | 2000-183408 | 6/2000 |
| JP | 2000-294834 | 10/2000 |
| JP | 2001 156331 | 6/2001 |
| JP | 2001/307506 | 11/2001 |
| JP | 2002-150821 | 5/2002 |
| JP | 2003-515956 | 5/2003 |
| JP | 2003-529889 | 10/2003 |
| JP | 2004-080046 | 3/2004 |
| JP | 2004-103443 | 4/2004 |
| JP | 2004-253309 | 9/2004 |
| JP | 2004-356116 | 12/2004 |
| JP | 2004-363055 | 12/2004 |
| JP | 2005-142311 | 6/2005 |
| JP | 2007-122950 | 5/2007 |
| JP | 2007-141737 | 6/2007 |
| WO | WO 00/19546 | 4/2000 |
| WO | WO 01/41215 | 6/2001 |
| WO | WO 02/054503 | 7/2002 |
| WO | WO 2005/004202 A2 | 1/2005 |
| WO | WO 2005/013365 A2 | 2/2005 |
| WO | WO 2005/022030 | 3/2005 |
| WO | WO 2005078338 A1 | 8/2005 |
| WO | WO 2005/124877 | 12/2005 |
| WO | WO 2006/003559 | 1/2006 |
| WO | WO 2006/028312 A1 | 3/2006 |
| WO | WO 2006/061728 A2 | 6/2006 |
| WO | WO 2008/103876 A1 | 2/2008 |
| WO | WO 2010/015820 A1 | 2/2010 |

OTHER PUBLICATIONS

U.S. Appl. No. 60/793,524, filed Apr. 20, 2006, Van De Ven.
U.S. Appl. No. 60/868,134, filed Dec. 1, 2006, Van De Ven.
U.S. Appl. No. 60/978,880, filed Oct. 10, 2007, Van De Ven.
U.S. Appl. No. 60/990,435, filed Nov. 27, 2007, Van De Ven.
U.S. Appl. No. 60/990,439, filed Nov. 27, 2007, Negley.
U.S. Appl. No. 60/990,724, filed Nov. 28, 2007, Negley.
U.S. Appl. No. 61/022,886, filed Jan. 23, 2008, Myers.
U.S. Appl. No. 61/037,365, filed Mar. 18, 2008, Van De Ven.
U.S. Appl. No. 61/039,926, filed Mar. 27, 2008, Myers.
U.S. Appl. No. 61/041,404, filed Apr. 1, 2008, Negley.
U.S. Appl. No. 61/075,513, filed Jun. 25, 2008, Roberts.
"Cree XLamp XR-E and XR-C LED Binning and Labeling", pp. 1-15, Copyright 2007-2008 Cree, Inc. Application Note: CLD-AP12.008.
Cree® XLamp® 7090 XR-E Series LED Binning and Labeling.
International Search Report and Written Opinion corresponding to International Application No. PCT/US2007/009462; Mailing Date: Oct. 24, 2008.
International Search Report and Written Opinion corresponding to International Application No. PCT/US2007/009459; Mailing Date: Mar. 3, 2008.
International Search Report and Written Opinion corresponding to International Application No. PCT/US2008/054665; Mailing Date: Jul. 16, 2008.
International Search Report and Written Opinion corresponding to International Application No. PCT/US2007/086593; Mailing Date: Apr. 18, 2008.
International Search Report and Written Opinion corresponding to international Application No. PCT/US2006/048654; Mailing Date: Feb. 13, 2008.
International Search Report and Written Opinion corresponding to International Application No. PCT/US2008/063042; Mailing Date: Jul. 21, 2008.
International Search Report and Written Opinion corresponding to international Application No. PCT/US2007/086027; Mailing Date: Apr. 25, 2008.
International Search Report and Written Opinion corresponding to International Application No. PCT/US2008/063021; Mailing Date: Aug. 5, 2008.
International Search Report and Written Opinion corresponding to international Application No. PCT/US2008/051633; Mailing Date: Aug. 14, 2008.
International Search Report and Written Opinion corresponding to International Application No. PCT/US2008/063016; Mailing Date: Aug. 5, 2008.
International Search Report and Written Opinion corresponding to International Application No. PCT/US2008/063027; Mailing Date: Jul. 23, 2008.
International Search Report and Written Opinion corresponding to International Application No. PCT/US2007/09629; Mailing Date: Feb. 11, 2008.
International Search Report and Written Opinion corresponding to International Application No. PCT/US2008/079299; Mailing Date: Jan. 9, 2009.
International Search Report and Written Opinion corresponding to International Application No. PCT/US2008/063020; Mailing Date: Jul. 21, 2008.
International Search Report and Written Opinion corresponding to International Application No. PCT/US2009/003768; Mailing Date: Sep. 24, 2009.

(56) References Cited

OTHER PUBLICATIONS

Krames, "Lumileds Lighting, Light from Silicon Valley" Progress and Future Direction of LED Technology, SSL Workshop, Nov. 13, 2003, pp. 1-21.
"LED Binning" Cree LED Light, pp. 1-12 (2007).
Mirhosseini, et al. "Improved Color Rendering and Luminous Efficacy in Phosphor-Converted White Light-Emitting Diodes by Use of Dual-Blue Emitting Active Regions" Optical Society of America 17(13):10806-10813 (2009).
Ohno, "Simulation Analysis of White LED Spectra and Color Rendering" National Institute of Standards and Technology, USA, pp. 1-4.
"Specifications for the Chromaticity of Solid State Lighting Products" American National Standard Lighting Group, ANSI_NEMA_ANSLG C78.377-2008, pp. 1-17 (Jan. 9, 2008).
Van de Ven et al., "Warm White Illumination with High CRI and High Efficacy by Combining 455 nm Excited Yellowish Phosphor LEDs and Red AlInGaP LEDs" First International Conference on White LEDs and Solid State Lighting.
US Publication No. US2008/0007172, Date: Jan. 2008. to Tan et al.
US Publication No. US2005/0135094, Date: Jun. 2005. to Lee et al.
US Publication No. US2007/0291467, Date Dec. 2007. to Nagai et al.
US Publication No. US2009/0147508, Date: Jun. 2009 to Bertram et al.
U.S. Appl. No. 12/154,691, filed May 23, 2008.
U.S. Appl. No. 12/156,995, filed Jun. 5, 2008.
U.S. Appl. No. 12/475,261, filed May 29, 2009.
US Publication No. US2008/0310158. Date: Dec. 18, 2008. to Harbers et al.
U.S. Appl. No. 12/557,306, filed Sep. 10, 2009.
Cree's LR6, LR24 and LR4 data sheets, downloaded on Jul. 23, 2010. available at www.cree.com.
Cree's XLamp® MP-L EasyWhite™ LED, downloaded on Jun. 1, 2010 at http://www.cree.com/products/xlamp_mpl.asp pp. 1-2.
U.S. Appl. No. 12/606,377, filed Oct. 27, 2009, to Pickard.
U.S. Appl. No. 11/947,323, filed Nov. 29, 2007.
Rosco, Inc. Permacolor Data Sheet, Copyright 2001, #1013 Goldenrod.
Rosco, Inc. Permacolor Data Sheet, Copyright 2001, #3409 ¼ CTO.
International Search Report and Written Opinion for PCT Patent Application No. PCT/US2011/001011 mailed Sep. 6, 2011.

\* cited by examiner

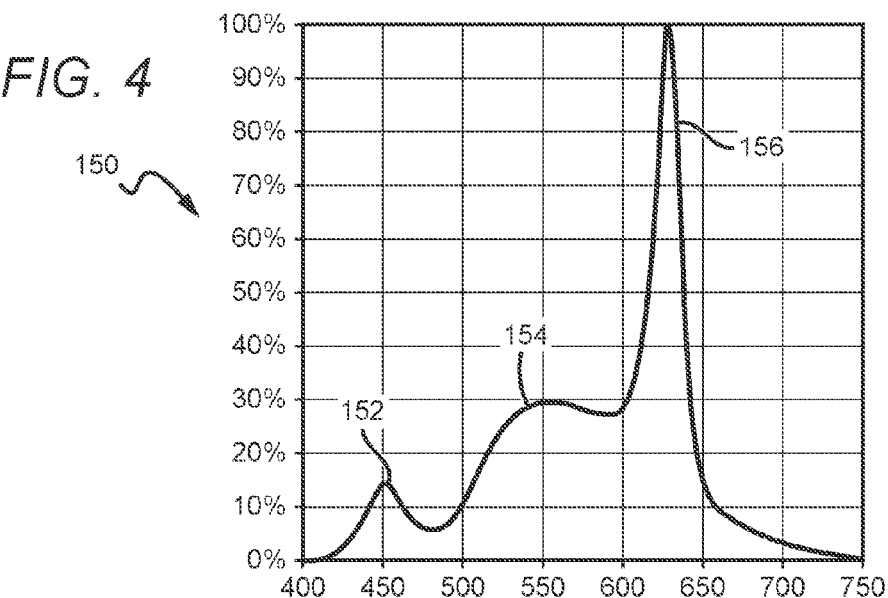
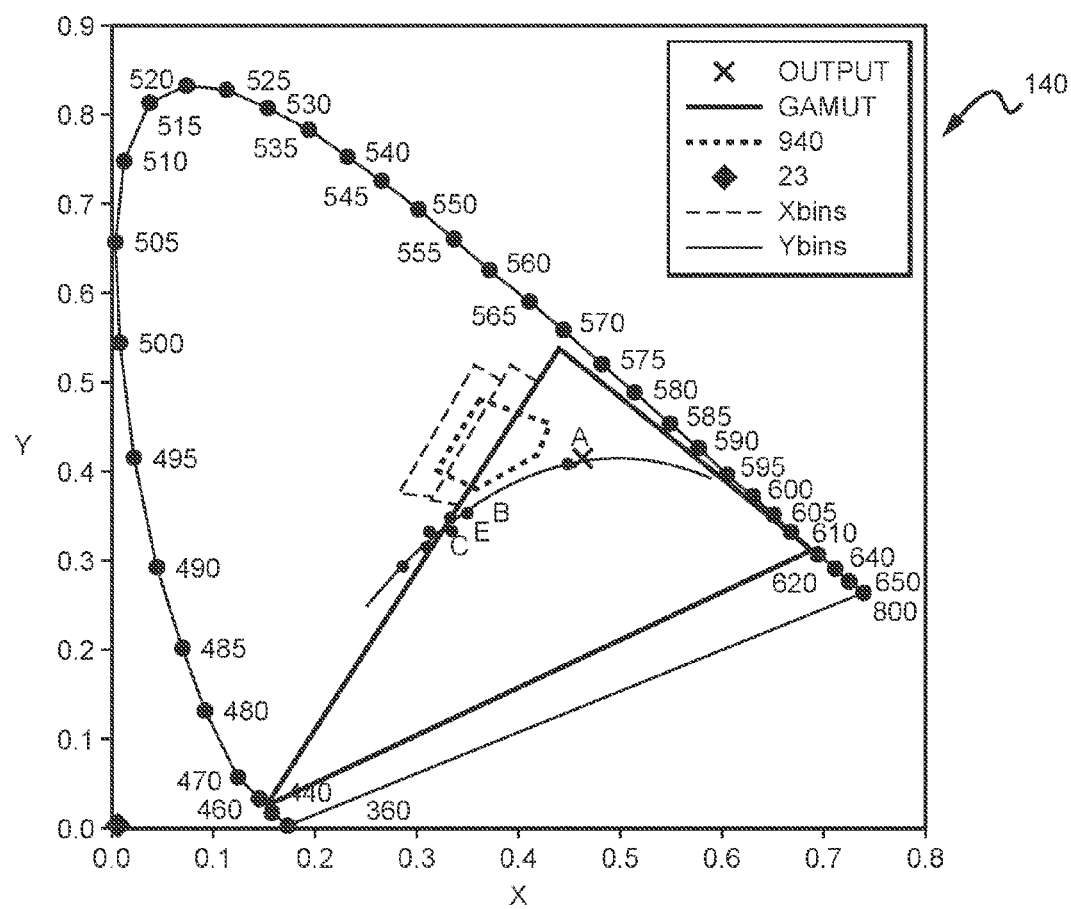

| CR6 + NO FILTER | | 2700K | |
|---|---|---|---|
| LED OUTPUT | | FIXTURE OUTPUT | |
| x | 0.4618 | PSU off | 100% |
| y | 0.4133 | Optic EFF | 100% |
| CCTn | 2694 | Lumens | 552 |
| CRI Ra | 92.5 | Power | 10.80 |
| Lumens | 552.3 | LPW | 51.14 |
| Δu'v' Target | 0.0012 | du'v' BBL | 0.0012 |
| LEP | 337 | GAI | 51% |

160 ↙  170 ↘

| CR6 + 43409 1/4 CTO | | 2400K | |
|---|---|---|---|
| LED OUTPUT | | FIXTURE OUTPUT | |
| x | 0.4888 | PSU off | 100% |
| y | 0.4181 | Optic EFF | 100% |
| CCTn | 2396 | Lumens | 435 |
| CRI Ra | 92.9 | Power | 10.80 |
| Lumens | 434.8 | LPW | 40.16 |
| Δu'v' Target | 0.0017 | du'v' BBL | 0.0017 |
| LEP | 333 | GAI | 39% |

200 ↙  210 ↘

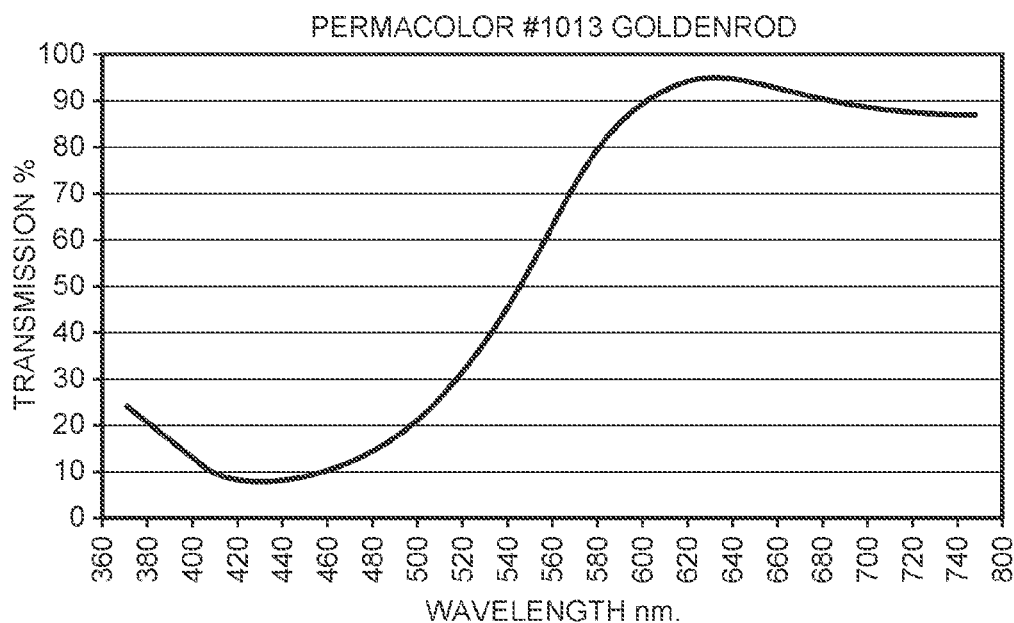
FIG. 11
FIG. 14
| CR6 + 43409 1/4 CTO | | 2400K | |
|---|---|---|---|
| LED OUTPUT | | FIXTURE OUTPUT | |
| x | 0.5571 | PSU off | 100% |
| y | 0.4128 | Optic EFF | 100% |
| CCTn | 1772 | Lumens | 307 |
| CRI Ra | 89.0 | Power | 10.80 |
| Lumens | 306.6 | LPW | 28.39 |
| Δu'v' Target | 0.0028 | du'v' BBL | 0.0028 |
| LEP | 309 | GAI | 12% |
240  250
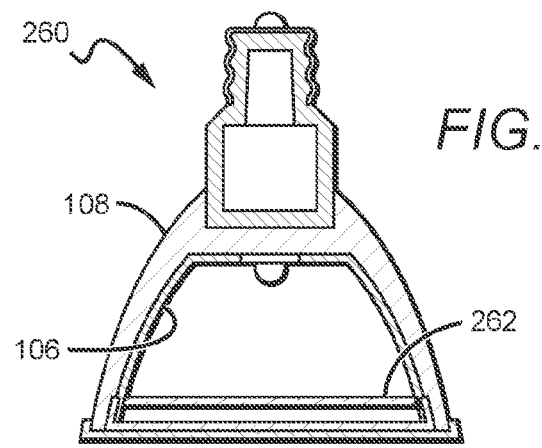
FIG. 15
260

FIG. 16
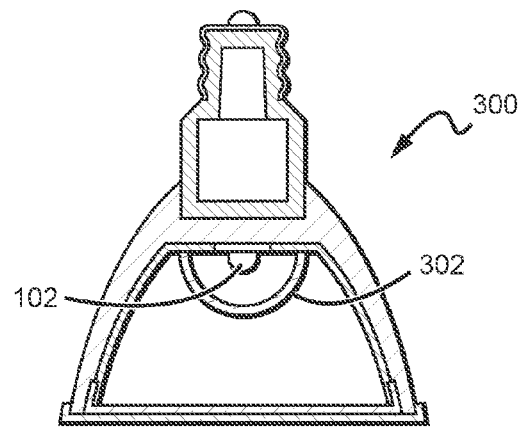
FIG. 17
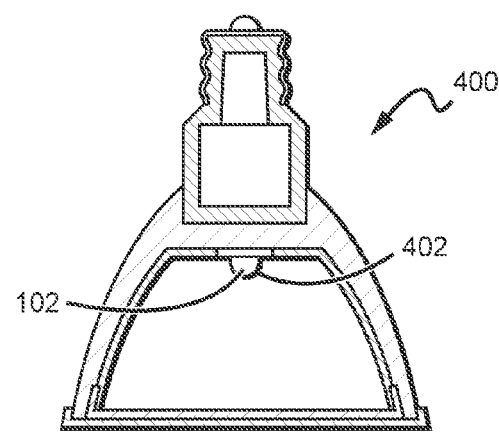
FIG. 18
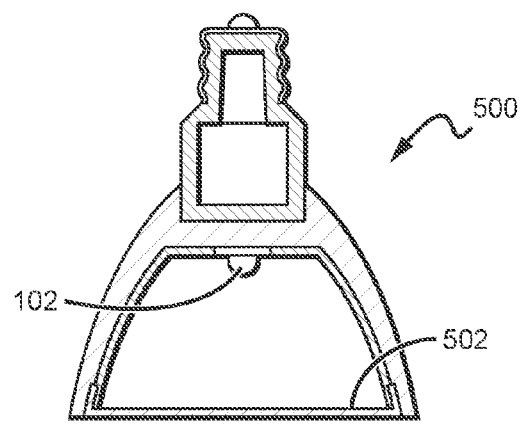
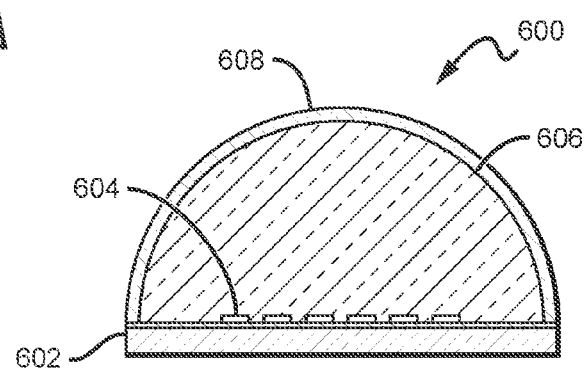
FIG. 19

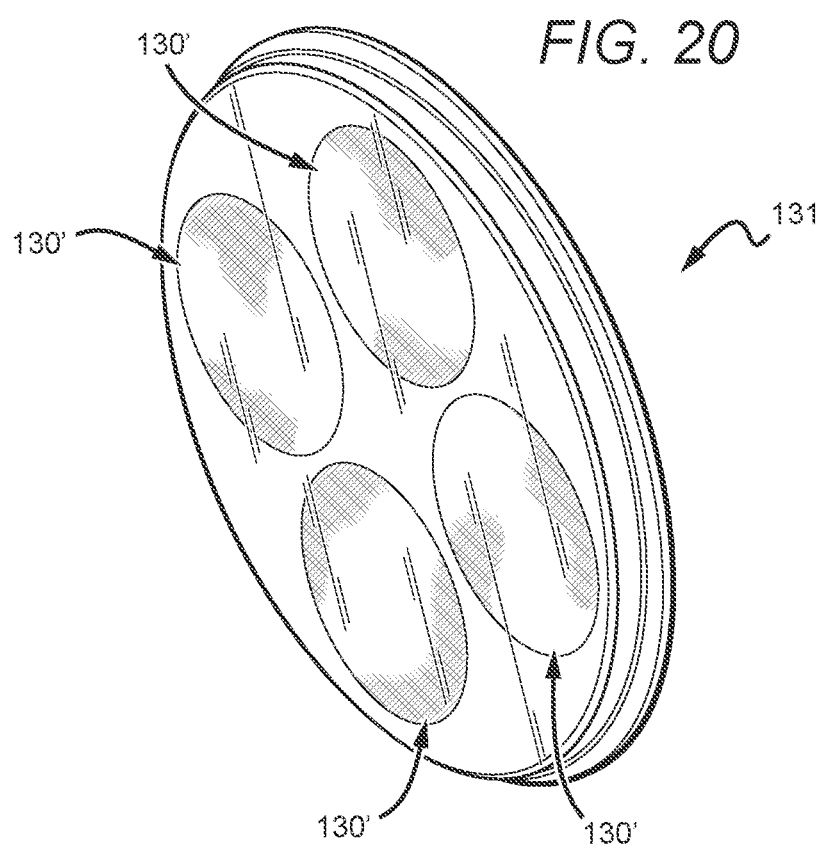

SOLID STATE LIGHT SOURCE EMITTING WARM LIGHT WITH HIGH CRI

This application is a continuation of claims the benefit of U.S. application Ser. No. 12/794,491, filed on Jun. 4, 2010.

BACKGROUND OF THE INVENTION

Field of the Invention

This invention relates to solid state lighting and in particular to solid state light sources or lamps that emit warm light with a high color rendering index (CRI).

Description of the Related Art

Light emitting diodes (LED or LEDs) are solid state devices that convert electric energy to light, and generally comprise one or more active layers of semiconductor material sandwiched between oppositely doped layers. When a bias is applied across the doped layers, holes and electrons are injected into the active layer where they recombine to generate light. Light is emitted from the active layer and from all surfaces of the LED.

LEDs have certain characteristics that make them desirable for many lighting applications that were previously the realm of incandescent or fluorescent lights. Incandescent lights are very energy-inefficient light sources with approximately ninety percent of the electricity they consume being released as heat rather than light. Fluorescent light bulbs are more energy efficient than incandescent light bulbs by a factor of about 10, but are still relatively inefficient. LEDs by contrast, can emit the same luminous flux as incandescent and fluorescent lights using a fraction of the energy.

In addition, LEDs can have a significantly longer operational lifetime. Incandescent light bulbs have relatively short lifetimes, with some having a lifetime in the range of about 750-1000 hours. Fluorescent bulbs can also have lifetimes longer than incandescent bulbs such as in the range of approximately 10,000-20,000 hours, but provide less desirable color reproduction. In comparison, LEDs can have lifetimes between 50,000 and 70,000 hours. The increased efficiency and extended lifetime of LEDs is attractive to many lighting suppliers and has resulted in their LED lights being used in place of conventional lighting in many different applications. It is predicted that further improvements will result in their general acceptance in more and more lighting applications. An increase in the adoption of LEDs in place of incandescent or fluorescent lighting would result in increased lighting efficiency and significant energy saving.

There are other lighting characteristics that are important to the general acceptance of LEDs for some applications. The light generated by different light sources, including incandescent, fluorescent and LEDs, can be measured in terms of color rendering index (CRI or CRI Ra) and color temperature. CRI is a quantitative measurement of the ability of a light source to reproduce the colors of various objects faithfully in comparison with an ideal or natural light source. Stated differently, it is a relative measure of the shift in surface color of an object when lit by a particular lamp. Light sources with a high CRI approaching 100 can be desirable in color-critical applications such as photography and cinematography. Daylight has a high CRI of approximately 100 and incandescent bulbs have a relatively close CRI of greater than 95. By comparison, fluorescent lighting has a lower CRI in the range of 70-80, and mercury vapor or sodium lamps have a much lower CRI of 40 or less. High quality light suitable for general indoor illumination should have a CRI of greater than 90.

Color temperature is a characteristic of light source that is determined by comparing the light's chromaticity with that of an ideal black-body radiator. The temperature (usually measured in kelvins (K)) at which the heated black-body radiator matches the color produced by the light source is that source's color temperature. For incandescent light sources the light is of thermal origin and is very close to that of an ideal black-body radiator. Higher color temperatures of 5000 K or more are "cool" and have green to blue colors while lower color temperatures of 2700 to 3500 K are considered "warm" and have yellow to red colors. General illumination can have a color temperature between 2,000 and 10,000 K, with the majority of general lighting devices being between 2,700 and 6,500 K.

In contrast to incandescent radiation, light sources, such as fluorescent lamps, emit light primarily by processes other than raising the temperature of a body. This means the emitted radiation does not follow the form of a black-body spectrum. These sources are assigned what is known as a correlated color temperature (CCT). CCT is the color temperature of a black body radiator which to human color perception most closely matches the light from the lamp. For high quality light sources it is also important that color of the illumination be as close as possible to that of a black body spectrum (i.e. black body locus on CIE chromaticity diagram).

Solid state light sources have been developed that utilize a one or more LEDs coated by a conversion material to produce a white wavelength of light. Some of these include blue emitting LEDs covered by a conversion material such as YAG:CE or Bose that absorbs some of the blue light and emits a yellow/green light. These LEDs emit a white light combination of blue LED light and yellow/green conversional material light. White light can similarly be produced with blue or UV LEDs covered by RGB phosphors, with the LEDs emitting a white light combination of red, green and blue. These methods have generally good efficacy, but only medium CRI. These have not been able to demonstrate both the desirable high CRI and high efficacy, especially with color temperatures between 2700K and 4000K.

Techniques for generating white light from a plurality of discrete light sources to provide improved CRI at the desired color temperature have been developed that utilize different hues from different discrete light sources. Such techniques are described in U.S. Pat. No. 7,213,940, entitled "Lighting Device and Lighting Method". In one such arrangement a 452 nm peak blue InGaN LEDs were coated with a yellow conversion material, such as a YAG:Ce phosphor, to provide a color that was distinctly yellow and had a color point that fell well above the black body locus. The yellow emission was combined with the light from reddish AlInGaP LEDs that "pulled" the yellow color of the yellow LEDs to the black body curve to produce warm white light. FIG. 1 shows a CIE diagram 10 with the tie lines 12 between red light 14 from red emitting LEDs and various yellow and yellowish points on the blue/YAG tie line 16. With this approach, high efficacy warm white light can be produced with improved CRI. Some embodiments exhibited improved efficacy, with CRI Ra of greater than 90 at color temperatures below 3500 K. The LR6, LR4 and LR24 LED based lighting fixtures, commercially available from Cree, Inc. (wwww.cree.com), can emit light with these improved characteristics.

In different lighting applications it can be desirable to use a light temperature of light that can appear more yellow or orange. Some of these can include illuminated areas outside of commercial establishments such as restaurants or retail locations. These yellow or orange colors have typically been provided by sodium vapor lights which can be undesirable because of their low CRI. This yellow/orange color can also be provided by incandescent bulbs utilizing the appropriate filter, but as mentioned above, these bulbs have a short lifetime and are very inefficient. The efficiency is made even worse by use of a filter.

SUMMARY OF THE INVENTION

The present invention is directed to solid state light sources, lighting devices and lamps arranged to provide emission with a warm color temperature and high CRI. One embodiment of a solid state lighting device according to the present invention comprises an LED device capable of emitting light in an emission spectrum. A filter is arranged so that at least some light from the LED light source passes through it, with the filter filtering at least a portion of the light source emission spectrum. The resulting light source light has a different color temperature but substantially the same CRI after passing through the filter.

One embodiment of an LED lamp according to the present invention comprises an LED light source emitting light in a white light emission spectrum. A filter is arranged so that at least some light from the LED light source passes through it. The filter filters at least some of blue portion of the emission spectrum and at least some of a green/yellow portion of the spectrum. The filtered light source light has a lower temperature but substantially the same CRI after passing through the filter.

Another embodiment of an LED device according to the present invention comprises an LED light source emitting light with a color temperature and CRI. A means for filtering light from said LED light source is included to produce light with a different color temperature and substantially the same CRI as said light from said LED light source.

Still another embodiment of an LED device according to the present invention comprises an LED light source capable of emitting light in an emission spectrum and having a color point that is within 7 MacAdam ellipses of the black body locus. A filter is arranged so that at least some light from the LED light source passes through it, with the filter filtering at least some of one or more portions of the light source emission spectrum, the filtered light source light having a different color point that is also within 7 MacAdam ellipses of the black body locus.

One method for producing warm color temperature light with a high CRI, comprises providing a white light having with a white light color temperature and a high CRI. At least some of one or more spectral portions is filtered from the white light emission spectrum. The filtered light has an emission spectrum with a color temperature lower than the white light color temperature and a CRI that is substantially the same as the high CRI.

These and other aspects and advantages of the invention will become apparent from the following detailed description and the accompanying drawings which illustrate by way of example the features of the invention.

BRIEF DESCRIPTION OF THE DRAWINGS

FIG. 4 is a graph showing the emission spectrum for the light from lamp light source in one embodiment of a lamp according to the present invention;

FIG. 5 is a CIE diagram for the light from lamp light source in one embodiment of a lamp according to the present invention;

FIG. 11 is a graph showing the filtering characteristics for another embodiment of a filter according to the present invention;

FIG. 14 are tables showing certain emission characteristics for light from lamp light source after passing through a filter having characteristics of FIG. 11;

FIG. 15 is a sectional view of another embodiment of a lamp according to the present invention with filter behind the lamp lens;

FIG. 16 is a sectional view of another embodiment of a lamp according to the present invention with filter in a dome over the lamp light source;

FIG. 17 is a sectional view of another embodiment of a lamp according to the present invention with filter colorant in the lamp light source encapsulant;

FIG. 18 is a sectional view of another embodiment of a lamp according to the present invention with filter in the lamp lens; and FIG. 19 is a sectional view of one embodiment of an LED package according to the present invention with filter over the package encapsulant.

FIG. 20 is a perspective view of another embodiment of a filter according to the present invention.

DETAILED DESCRIPTION OF THE INVENTION

Figure 1:
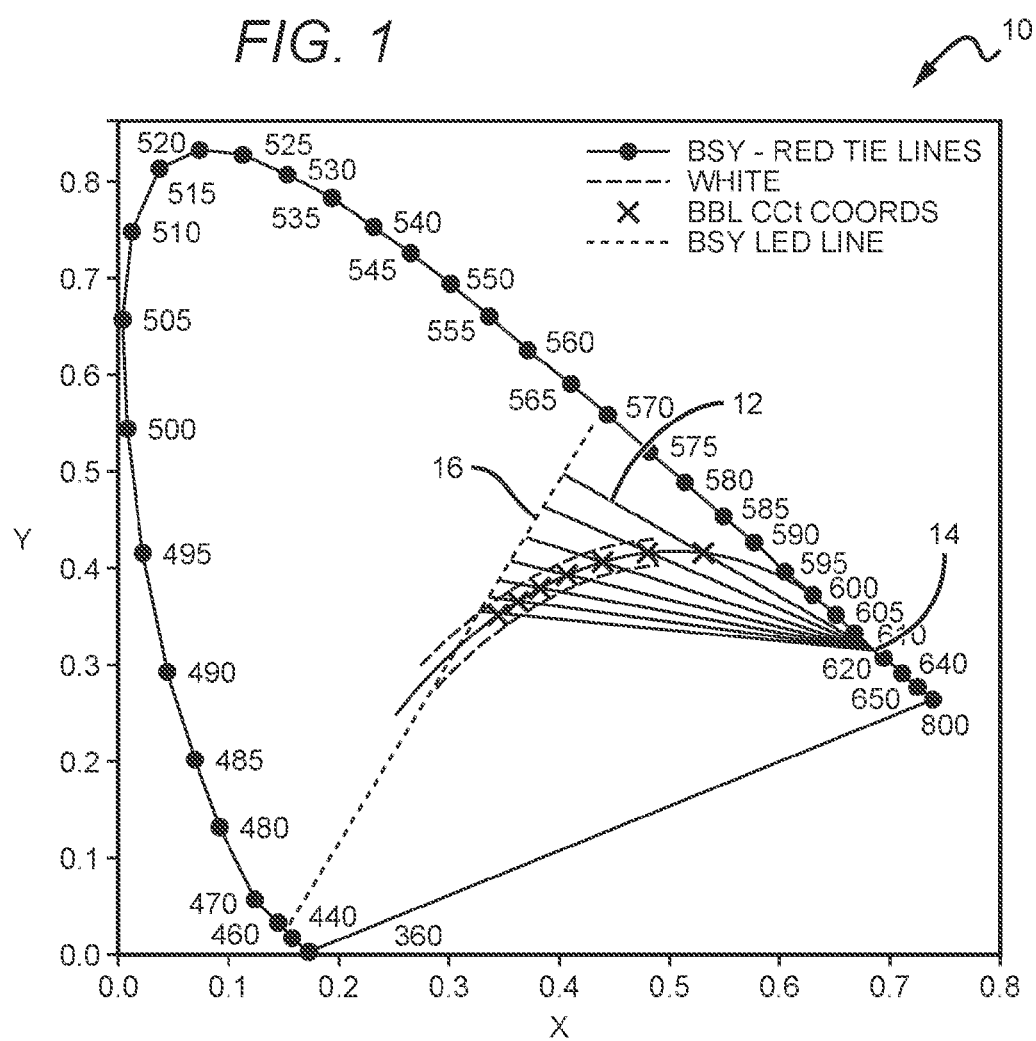
FIG. 1 is a CIE diagram showing the tie lines between BSY and red emitters.

The present invention is directed to solid state light sources, luminaires or lamps ("lamp" or "lamps") that are arranged to emit the desired temperature of light with the desired CRI by utilizing different filtering arrangements to filter certain wavelengths of light emitted by the lamp's light source. In some embodiments, a filter can be used with a lamp having a white emitting light source, with at least some of the lamp's white light passing through the filter. One or more wavelength ranges or spectrum components of light can be filtered out by the filter, with the lamp then emitting light with a different color temperature but with a relatively high CRI. In some embodiments the CRI of the filtered light can be substantially the same as the CRI of the white light source before it is filtered. In some embodiments of white emitting lamps, the filter can filter out at least some of the blue and green/yellow spectral portions from the white light emission spectrum, such that the resulting lamp emission can have a warmer color temperature, but can have a CRI substantially the same as the white. In some embodiments up to 90% blue spectral component and up to 50% of green/yellow spectral component can be filtered to achieve the desired color temperature.

It is understood many different lamp emissions with many different color temperatures can be filtered according to the present invention to produce light with a different color temperature, both higher (cooler) and lower (warmer) than the lamp emission. In some embodiments, the lamp emission can have a color temperature of approximately 2700K or higher, and the filtered light can have a color temperature of 2500K or lower.

This arrangement provides the advantage of a lamp utilizing the improved efficiency and lifetime of LEDs, while at the same time providing for warm light that can be desirable in some applications. This arrangement provides the further advantage of an LED based warm light having a high CRI. Adding filters to existing lamps or components can provide and inexpensive and relatively easy way of providing warmer temperature high CRI emission.

Different lamp embodiments according to the present invention can utilize filters having many different shapes and sizes and located in many different locations in the lamp. As further described below the filters can be mounted to the outside or inside of the lamp body or can be mounted directly to the lamp light source. In other embodiments, the filtering can be provided by colorants mixed in the lamp lens or in an encapsulant that is part of the light source.

Although the preset invention is described below primarily with reference to providing filters in solid state lamps, it is understood that the filters can be provided at the LED chip or package level. This can comprise add-on filters or filtering colorants in the lens, encapsulant or coating of the chip or package.

As will be appreciated by one of skill in the art, references to a color temperature of light emitted from an LED, lamp light source, and filtered light, refer to a range of color temperatures centered around the specified value and is not limited to only the exact value specified. Thus, references to specific color temperatures refers to nominal values. For example, a color temperature of 2650 K may be considered equivalent to a nominal value color temperature of 2700K. See also, ANSI C78.377-2008. Accordingly, in some embodiments, references to a color temperature refers to variations of 1 MacAdam ellipses from the nominal value, in other embodiments, references to a color temperature refers to variations of 3 MacAdam ellipses from the nominal value, in further embodiments, references to a color temperature refers to variations of 5 MacAdam ellipses from the nominal value and in still further embodiments, references to a color temperature refers to variations of 7 MacAdam ellipses from the nominal value.

The embodiments below are described with reference to emission spectrums from light source emission and filtered light source emission. These spectrums can cover many different ranges of wavelengths of light covering many different ranges of colors. Reference is made to portions of the emission spectrum, which can refer to zones, components, ranges, or colors in the emission spectrum.

The present invention is described herein with reference to certain embodiments, but it is understood that the invention can be embodied in many different forms and should not be construed as limited to the embodiments set forth herein. In particular, the present invention is described below in regards to certain lamps having filters or filtering characteristics. It is understood that the present invention is applicable to many different lamps beyond those described below, that can be arranged in many different ways with many different features.

It is also understood that when an element such as a layer, region or substrate is referred to as being "on" another element, it can be directly on the other element or intervening elements may also be present. Furthermore, relative terms such as "inner", "outer", "upper", "above", "lower", "beneath", and "below", and similar terms, may be used herein to describe a relationship of one layer or another region. It is understood that these terms are intended to encompass different orientations of the device in addition to the orientation depicted in the figures.

Although the terms intermediate, outer and similar terms etc. may be used herein to describe various elements and components, these elements and components should not be limited by these terms. These terms are only used to distinguish one element or component from another. Thus intermediate or outer element or component could be referred to by a different term without departing from the teachings of the present invention.

Embodiments of the invention are described herein with reference to cross-sectional view illustrations that are schematic illustrations of embodiments of the invention. As such, the actual thickness of the elements shown can be different, and variations from the shapes of the illustrations as a result, for example, of manufacturing techniques and/or tolerances are expected. Embodiments of the invention should not be construed as limited to the particular shapes of the elements or regions illustrated herein but are to include deviations in shapes that result, for example, from manufacturing. An element or region illustrated or described as square or rectangular will typically have rounded or curved features due to normal manufacturing tolerances. Thus, the elements and regions illustrated in the figures are schematic in nature and their shapes are not intended to illustrate the precise shape of an element or region of a device and are not intended to limit the scope of the invention.

Figure 2:
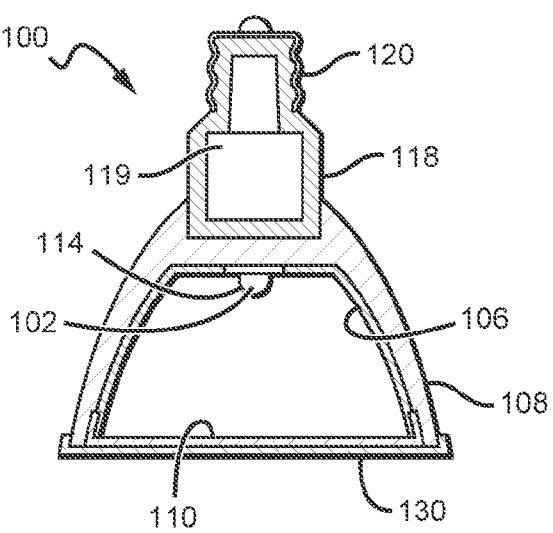
FIG. 2 is a sectional view of one embodiment of a lamp according to the present invention with filter over the lamp lens.

It is understood that the present invention can be used in conjunction with many different solid state lamps arranged in many different ways. FIGS. 1 and 2 show just one embodiment of a solid state lamp 100 according to the present invention. The lamp 100 is similar to and can have many of the features similar to the solid state lamps described in detail in U.S. patent application Ser. No. 12/606,377 to Pickard, entitled "Hybrid Reflector System for Lighting Device," assigned to Cree LED Lighting Solutions, Inc. This application is incorporated by reference as if fully set forth herein.

The lamp 100 discloses a solid state light source 102 that is disposed at the base of a bowl-shaped region within the lamp 100. Many different solid state light sources can be used including discrete LED chips or packages having single LED chips, with the chips or packages electrically coupled together to emit light in response to electrical signals. Alternatively, the light source 102 can be one or more LED packages having a plurality of LED chips, some of which can emit different colors of light, with the LED packages emitting the desired light from the combination of light from the LED chips. In some embodiments, several to more than two dozen LEDs can be mounted to a submount to create a single compact optical source. Examples of such structures can be found in U.S. patent application Ser. Nos. 12/154, 691, 12/156,995 and 12/475,261, all of which are assigned to CREE, Inc., and both of which are fully incorporated by reference herein. In other embodiments, the source 102 may comprise a multicolor monolithic structure (chip-on-board) bonded to a printed circuit board (PCB).

Embodiments according to the present invention may be utilized with light sources and/or multiple light sources having the characteristics described in U.S. Pat. No. 7,213,940 and/or in U.S. Patent Application Publication Nos. 2007/0267983, 2007/0278503, 2008/0084685, 2008/0084701, 2008/0106895, 2008/0106907 and 2008/0112168, the disclosures of which are incorporated by reference herein. Different commercially available LED chips and packages can be used, include those from the X-Lamp® family of products provided by Cree, Inc. in Durham, N.C. These can include but are not limited to the X-Lamp® MP-L EasyWhite™ LED package commercially available from Cree Inc.

An intermediate reflector 104 can be included in the lamps 100 (shown only in FIG. 3) according to the present invention, but it is understood that many embodiments can be provided without the reflector. The reflector can be disposed proximate to the light source 102 to help mix the light from the different LED chips in the light source 102. Some of the light emitted from the source 102 interacts with the intermediate reflector 104 such that it is redirected toward an outer reflector 106. The outer reflector 106 and the intermediate reflector 104 can work in concert to shape the light into a beam having characteristics that are desirable for a given application.

A protective housing 108 surrounds the light source 102 and the reflectors 104, 106. The source 102 is in good thermal contact with the housing 108 at the base of the outer reflector 106 to provide a pathway for heat to escape into the ambient. A lens 110 covers the open end of the housing 108 and provides protection from outside elements.

In the embodiment shown in FIG. 1, the source 102 is protected by an encapsulant 114. Encapsulants are known in the art and, therefore, only briefly discussed herein. The encapsulant 114 can function as a lens to shape the beam prior to incidence on the reflectors 104, 106. The encapsulant may be hemispherical, parabolic, or another shape, depending on the particular optical effect that is desired. The encapsulant 114 may contain wavelength conversion materials, such as phosphors for example. The encapsulant 114 may also contain light scattering particles, voids or other optically active structures to help with the color mixing process in the near field. Although light scattering particles, voids or other optically active structures dispersed within or on the encapsulant 114 may cause optical losses, it may be desirable in some applications to use them in concert with the reflectors 104, 106 so long as the optical efficiency is acceptable.

Color mixing in the near field may be aided by providing a scattering/diffuser material or structure in close proximity to the light sources. A near field diffuser is in, on, or in close proximity to the light sources with the diffuser arranged so that the source can have a low profile while still mixing the light in the near field. By diffusing in the near field, the light may be pre-mixed to a degree prior to interacting with either of the reflectors 104, 106. Techniques and structures for near field mixing are discussed in detail in U.S. patent application Ser. No. 12/475,261 by Negley, et al. and assigned to CREE, Inc. This application is incorporated by reference as if fully set forth herein.

A diffuser can comprise many different materials arranged in many different ways. In some embodiments, a diffuser film can be provided on the encapsulant 114. In other embodiments, the diffuser can be included within the encapsulant 114. In still other embodiments, the diffuser can be remote from the encapsulant, such as on the lens 110 as discussed in detail hereafter. The lens 110 may be textured across an entire surface, or it may have a certain portion that is textured such as an annular region, for example, depending on the application. Various diffusers can be used in combination. For example, both the encapsulant 114 and the lens 110 may comprise diffusive elements. In embodiments comprising a diffuser film disposed on the lens 110, it can be possible to adjust the profile of the output beam by adjusting the properties of the diffuser film. (as described in)

Many different structures and materials can be used as a diffuser such as scattering particles, geometric scattering structures or microstructures, diffuser films comprising microstructures, or diffuser films comprising index photonic films. The diffuser can take many different shapes; it can be flat, hemispheric, conic, or variations of those shapes, for example.

The housing 108 surrounds the outer reflector 106, protecting the internal components of the lamp device 100, and the lens 110 and the housing 108 may form a watertight seal to keep moisture from entering into the internal areas of the device 100. In some embodiments, the lens 110 can be arranged such that an edge of the lens remains exposed beyond the open end of the outer reflector 106. In other embodiments, the lens may be recessed in the housing and connected to an inside surface thereof.

A portion of the housing 108 may comprise a material that is a good thermal conductor, such as aluminum or copper. The thermally conductive portion of the housing 108 can function as a heat sink by providing a path for heat from the source 102 through the housing 108 into the ambient. The source 102 is disposed at the base of the outer reflector 106 such that the housing 108 can form good thermal contact with the source 102. To facilitate the transfer of heat, the housing 108 may include fin-shaped structures 116 which increase the surface area of the housing 108. Thus, the source 102 may comprise high power LEDs that generate large amounts of heat.

Power can be delivered to the source 102 through a protective conduit 118. The lamp device 100 may be powered by a remote source connected with wires running through the conduit 118, or it may be powered internally with a battery that is housed within the conduit 118. Different embodiments can be arranged to fit in different electrical receptacles, and in some embodiments the base can be of the type to fit in conventional electrical receptacles. In some embodiments, the conduit 118 may have a threaded end 120 for mounting to an external structure such as a standard Edison socket. In other embodiments, the conduit comprises a standard plug and the electrical receptacle can be a standard outlet, or the base can be a GU24 base unit, or it can be a clip and the electrical receptacle can be a receptacle which receives and retains the clip (e.g., as used in many fluorescent lights). These are only a few of the options for the conduit and receptacles, and different arrangements can be used that safely deliver electricity from the receptacle to the lamp 100.

The conduit 118 functions not only as a structural element, but may also provide electrical isolation for the high voltage circuitry that it houses which helps to prevent shock during installation, adjustment and replacement. The conduit 118 may comprise an insulative and flame retardant thermoplastic or ceramic, although other materials may be used. The conduit 118 can also house a power supply/ converter 119 that can comprise a conventional rectifier and high voltage converter. If power to the lamp comprises an AC voltage, the power supply/converter can convert the AC power to a form that causes the light source 102 to emit light with the desired color and intensity. Batteries may also be disposed within the conduit as part of the power supply/converter for those embodiments having an internal power source or to act as a backup in case an external power source fails.

In some embodiments, a optional diffuser film 124 (shown only in FIG. 3) can be disposed on the internal side of the lens 110 as shown. The diffuser film 124 may be uniformly diffusive across its entire face, or it may be patterned to have a non-uniform diffusive effect. For example, in some embodiments, the diffuser may be more diffusive in an annular region around the perimeter of the film 124 to provide additional scattering of the light which is incident on the outer perimeter portion of the lens 110.

The characteristics of the output light beam are primarily determined by the shape and arrangement of the intermediate reflector 104, the outer reflector 106, and the diffuser film 124, if present. The outer reflector 106 has a bowl or dome shape. The reflective surface of the outer reflector 106 may be smooth or faceted (as shown FIG. 5). In the embodiment shown, the lamp device 100 comprises a faceted outer reflector 106 with a plurality of adjacent panels to further break up the image of the different colors from the source 102. The outer reflector 106 may also be specular or diffuse.

The outer reflector 106 principally functions as a beam shaping device. Thus, the desired beam shape will influence the shape of the outer reflector 106. The outer reflector 106 is disposed such that it may be easily removed and replaced with other outer reflectors to produce an output beam having particular characteristics. In the device 100, the outer reflector 106 has a compound parabolic cross section with a truncated end portion that allows for a flat surface on which to mount the source 102.

The lamp 100 further comprises a filtering mechanism that can be arranged in different ways to filter one or more wavelength ranges or spectral portions of the emission spectrum in the light emitted from the lamp's light source 102. In the embodiment shown, the filtering mechanism comprises a light filter 130 that can be mounted to the housing 108, covering the lens 110. It is understood that in other embodiments the filter 130 can cover less than the entire lens 110, as shown in FIG. 20 with the filter 130', for example. As light passes from the light source 102, through the lens, at least some of it passes through the filter 130. The filter 130 can comprise a rigid material such as a plastic or glass having materials or structures that allow for it to filter the desired wavelengths of light. The filter 130 can be mounted to the end of the housing 108 using many different known mechanical mounting techniques such as clips, screws brackets, etc. Alternatively, the filter can be bonded in place over the lens 110 using known bonding agents such as epoxies or glues.

As discussed above the filter is arranged to filter out at least some of the light spectrum emitted by the lamp's light source 102 to produce a light with the desired color temperature and with a high CRI. In one embodiment according to the present invention, the light source 102 in the lamp 100 can emit white light having the emission spectrum 150 of FIG. 4 and the characteristics shown in the CIE diagram 140 of FIG. 5. Certain output characteristics of the lamp 100 are listed in the tables 160 and 170 provided in FIG. 6. This emission spectrum 150 includes a relatively narrow peak of blue emission 152 at approximately 450 nm, a somewhat broader peak of green/yellow emission 154 at approximately 550 nm, and a third narrow peak of orange/red emission 156 at approximately 625 nm. This emission spectrum provides an overall emission of white light with color temperature of 2694 and a CRI of 92.5 as shown in table 160. As provided in table 170, the light source also emits with an efficiency of 51.14 lumens per watt (LPW).

As discussed above, in certain applications it may be desirable to emit a warmer color while still having the benefit of the higher CRI provided by white light sources with a broad emission spectrum. Warmer conventional lights such as sodium vapor or solid state light sources with orange or red emitters, typically have the undesirable characteristic of low CRI. The present invention provides an inexpensive and relatively easy way of providing these warmer high CRI light sources using filters in different arrangements in conjunction solid state lamps, such as white emitting lamps.

Many different filter types can be used in the different embodiments of the present invention, including conventional gel, dye, polycarbonate or polyester filters, colored or stained glass, liquid dye filled cavities, colored compound materials, gemstones both natural and manmade including for example sapphire, SiC, resins, oils, etc. These are known filters having different materials that can selectively absorb portions of the light spectrum passing through the filter, and allow for the remaining portions of the spectrum to pass through. For example, a blue filter can absorb red and green light, while passing or transmitting the blue light portion of the spectrum. These different absorbing materials can be fixed in or formed over different materials that are transparent at least to the portions of the light structure that is to pass through the filter. In some embodiments, plastics or glass can be used that form rigid structures that can be mounted in a lamp or other light fixture, with the absorbing materials mixed in or coated on the structure.

Other embodiments of filters that can be used in the lamps according to the present invention can comprise layer or structure that reflects portions of the spectrum instead of absorbing it. One such filter is referred to as a dichroic filter that can comprise a rigid and transparent material such as glass or plastic that can be coated to reflect unwanted portions of the spectrum, while allowing the desired portion to pass. These reflective properties can be provided by vapor deposited layers of a thickness and number to select which bands of the spectrum, or color, to reflect. In dichotic filters, the unwanted spectrum or light energy is reflected rather than absorbed into the filter as heat energy. This provides dichroic filters the capability to resist color degradation that may be experienced by other filters that absorb light energy. Many different dichroic filters are commercially available from different sources such as Roscoe Inc., located in Stamford, Conn. It is understood that many different filters beyond those described above can also be used in different embodiments of the present invention.

In some embodiments utilizing a dichroic filter light reflected back at the filter can enhance generation of warmer temperature emission. Color of that that are reflected, including blue light that doesn't pass through the filter, can be redirected back to the light source. The light source can include LEDs covered by source phosphors, or other areas in the lamp can be at least partially coated with green and/or yellow and/or red phosphor. The reflected light can be absorbed and remitted by these phosphors to provide more green and/or yellow and/or red light. This increase the efficiency of the system over an absorptive filter by recycling the blue light into colors more prevalent in warm white light. Recycling of reflected light with filtering is discussed in detail in U.S. patent application Ser. No. 11/947,323 to Negley, et al., entitled "Lighting Device and Lighting Method." This application is incorporated by reference as if fully set forth herein.

Figures 6, 7, 10:
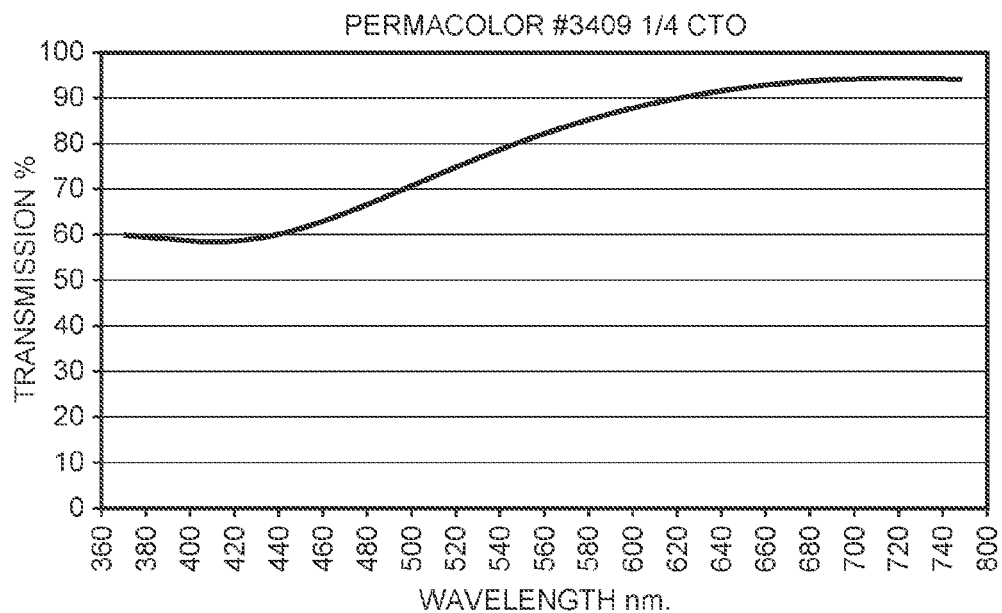
FIG. 6 are tables showing certain emission characteristics for the light from lamp light source in one embodiment of a lamp according to the present invention.
FIG. 7 is a graph showing the filtering characteristics for one embodiment of a filter according to the present invention.
FIG. 10 are tables showing certain emission characteristics for light from lamp light source after passing through a filter having characteristics of FIG. 7.

One example of a dichroic filter that can be used in different embodiments of the present invention is the Roscoe, Inc. Permacolor 43409 ¼ CTO, with FIG. 7 showing the transmission and reflection characteristics of this filter over a range of light wavelengths from 360 nm to 740 nm. At a wavelength of approximately 450 nm, which corresponds with the blue peak emission of the white light from the lamp 100 (see FIG. 4), the approximately 60% of blue light is transmitted, with the remaining approximately 40% being reflected. At 550 nm, which corresponds to the green/yellow peak emission from the lamp's white light (see FIG. 4), approximately 80% of the light is transmitted, with the remaining 20% being reflected. At 625 nm, which corresponds to the orange/red peak from the white light (see FIG. 4), more than 90% of the light is transmitted, with less than 10% being reflected.

The filter with the characteristics as shown in FIG. 7 results in more than 90% of the orange/red spectral portion being transmitted, while approximately 80% and 60% of the green/yellow and blue, respectively, being transmitted. This results in a more prominent reduction in the blue and green/yellow spectral portions when comparing the white light from the light source 102 to the same light after passing through the filter.

Figure 8:
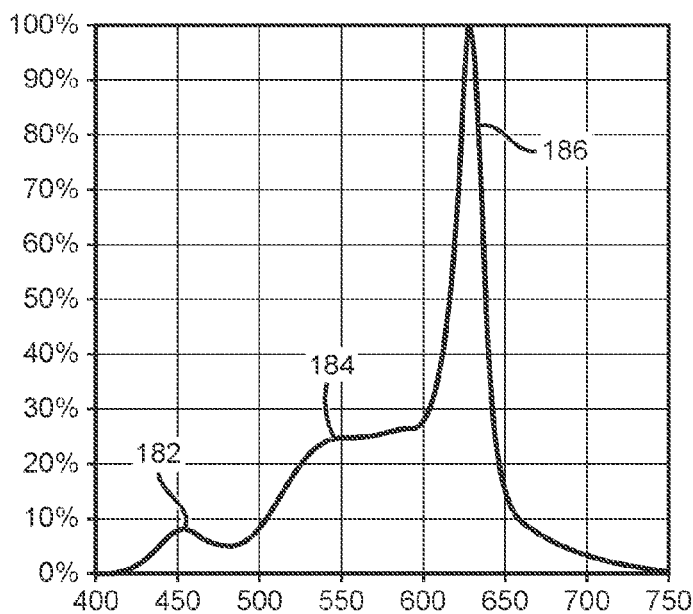
FIG. 8 is a graph showing the emission spectrum for the light from lamp light source after passing through a filter having the characteristics of FIG. 7.
Figure 9:
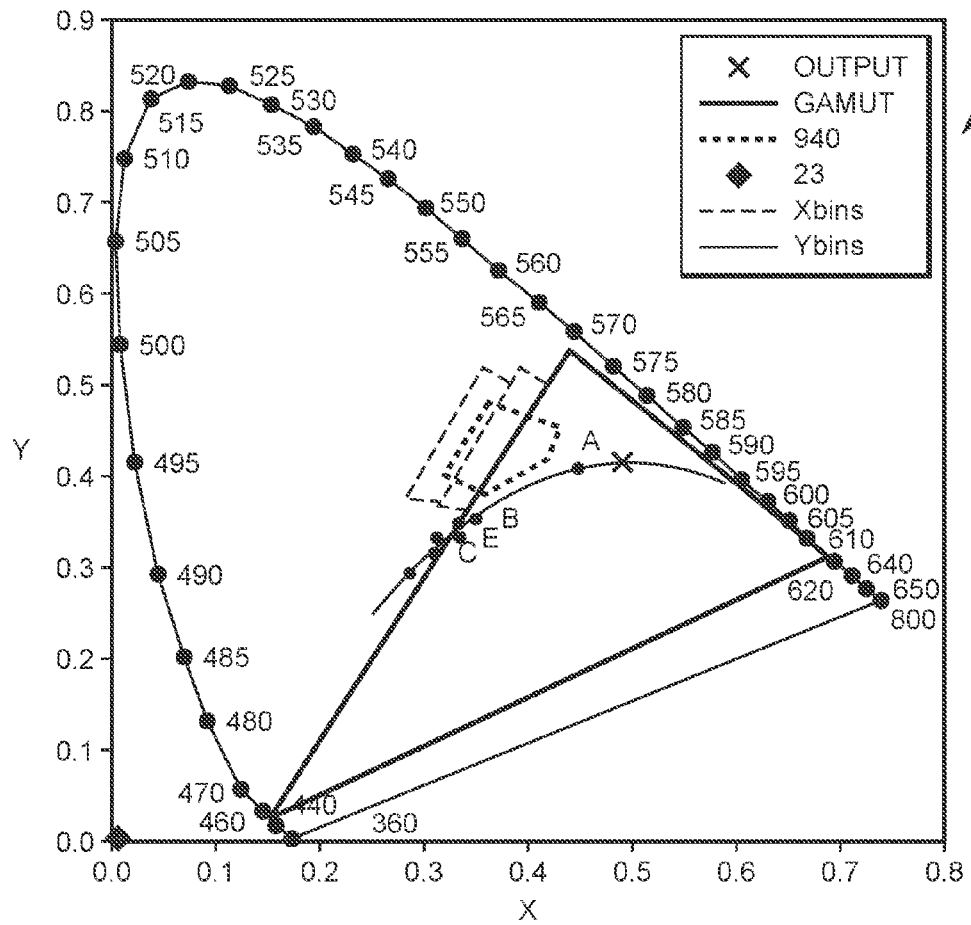
FIG. 9 is a CIE diagram for light from the lamp light source after passing through a filter having the characteristics of FIG. 7.

FIG. 8 shows the resulting emission spectrum 180 for the white light in FIG. 4 after it passes through a filter with characteristics shown in FIG. 7. FIG. 9 shows the corresponding CIE diagram 190 and FIG. 10 shows tables 200 and 210 with the certain emission characteristics of the lamp 100 with the filter 130. Referring first to the emission spectrum 180, the peak of the blue and green/yellow portions 182, 184 of the spectrum are reduced, while the peak of the orange/red portion 186 remains substantially unchanged. Referring now to table 200, the spectrum 180 results in a combined emission having a reduced color temperature of approximately 2400K (2396). The emission spectrum 180 still remains broad having remaining blue, green/yellow and red color portions, such that the CRI for the filtered light remains essentially the same (92.9) as white light before it passes through the filter. Referring now to table 210, this filtering, however, can result in a reduction in emission efficiency. In some embodiments, the reduction in efficiency can be less that 25% of the lumens output of the white light from the light source. For a filter with the characteristics as shown in FIG. 7 the resulting filtered light emits at approximately 40 LPW (approximately 22% reduction in efficiency).

Another example of a dichroic filter that can be used in different embodiments is the Roscoe, Inc. Permacolor 31013 Goldenrod, with FIG. 11 showing the transmission and reflection characteristics over a range of light wavelengths from 360 nm to 740 nm. At a wavelength of approximately 450 nm, approximately 10% of blue light is transmitted, with the remaining being reflected. At a wavelength of approximately 550 nm, approximately 55% of the light is transmitted, with the remaining 45% being reflected. At a wavelength of approximately 625 nm approximately 95% of the light is transmitted, with less than 10% being reflected.

The filter shown in FIG. 11 also results in nearly all of the orange/red spectral portion from the white light being transmitted, while approximately 45% and 90% of the green/yellow and blue spectrum portions, respectively, are reflected. This results in an even more prominent reduction in the blue and green/yellow spectral portions when comparing the white light from the light source 102 to the same light after passing through the filter.

Figure 12:
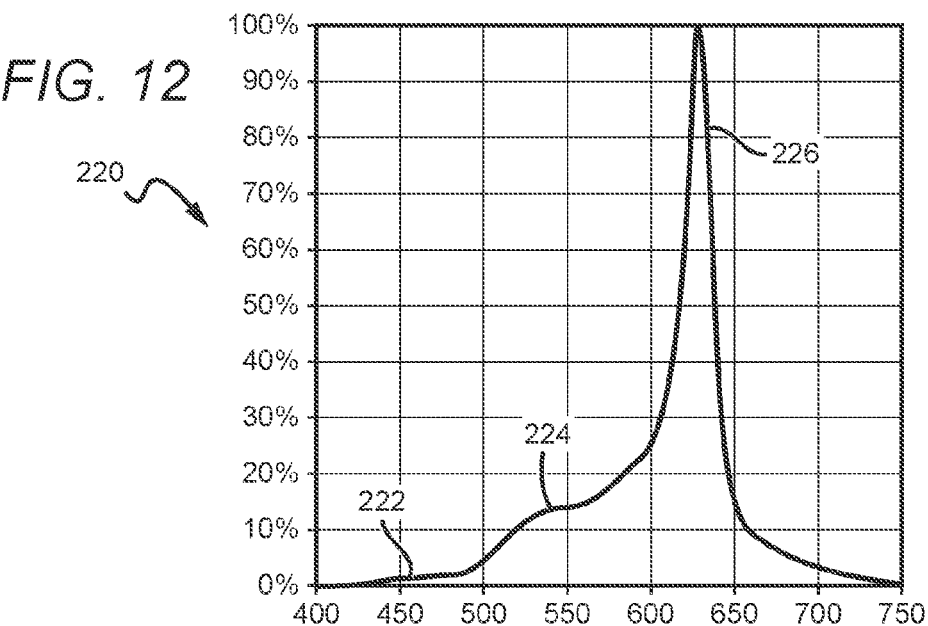
FIG. 12 is a graph showing the emission spectrum for the light from lamp light source after passing through a filter having the characteristics of FIG. 11.
Figure 13:
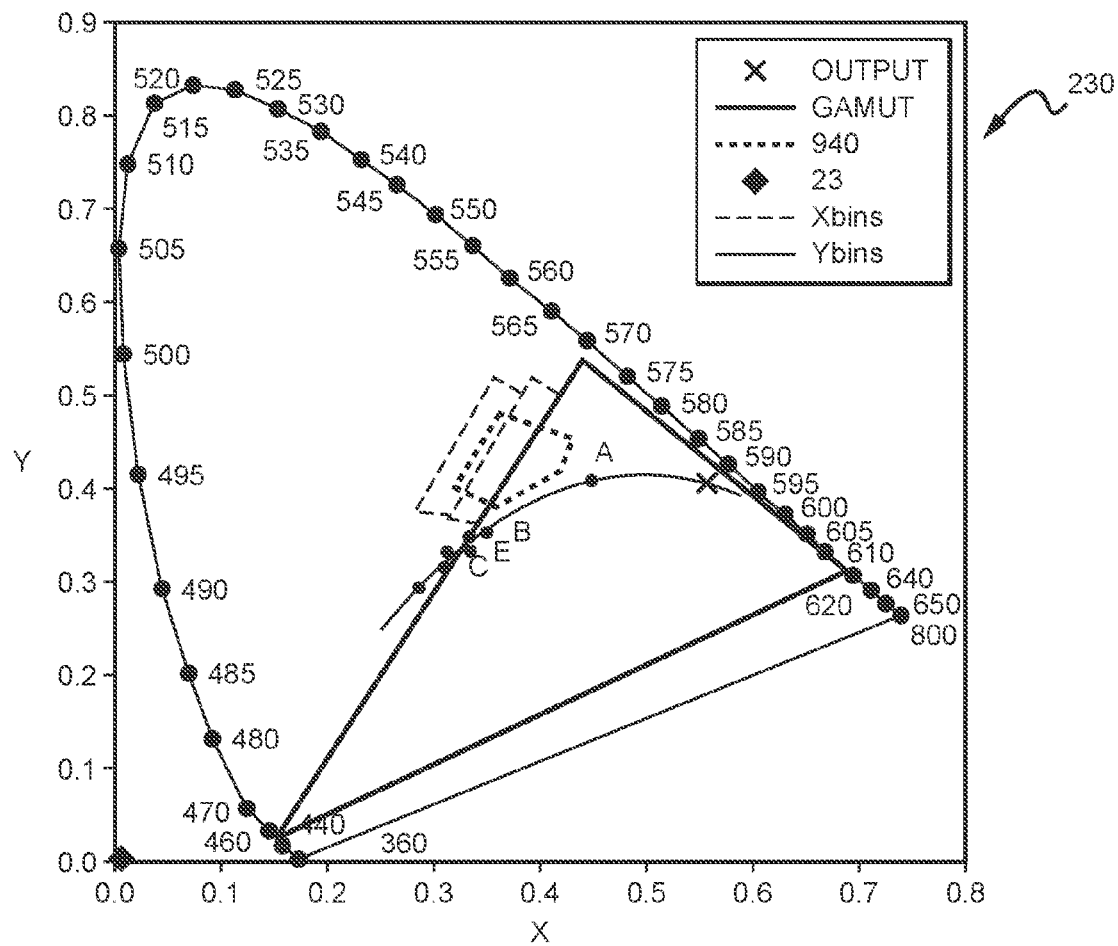
FIG. 13 is a CIE diagram for light from the lamp light source after passing through a filter having the characteristics of FIG. 11.

FIG. 12 shows the resulting emission spectrum 220 for the white light in FIG. 4 after it passes through a filter with characteristics shown in FIG. 11. FIG. 13 shows the corresponding CIE diagram 230 and FIG. 14 shows tables 240 and 250 with the certain emission characteristics of the lamp 100 after its light passes through a filter as shown in FIG. 11. Referring first to the emission spectrum 220, the peak of the blue spectral portion 222 is significantly reduced such that it approaches 1 to 2% at 450 nm. The green/yellow spectral portion 224 is also reduced, but not as significantly as the blue portion 222. The peak of the orange/red portion 226 remains substantially unchanged. Referring now to table 240, the spectrum 220 results in a combined emission having an even further reduced color temperature of approximately 1800K (1772). The emission spectrum 180 still remains broad having remaining blue, green/yellow and red color portions, such that the CRI for the filtered light remains high and close to that of the white light before passing through the filter. Referring to table 240. The CRI for spectrum 220 measures approximately 89. This increased filtering of the blue and green/yellow portions results in an even further reduction in emission efficiency. In some embodiments, the reduction in efficiency can be less that 50% of the lumens output of the white light from the light source. Referring to table 250 the resulting lamp emission efficiency with the filtering shown in FIG. 12 is approximately 28.39 LPW (approximately 45% reduction in efficiency).

It is understood that other filters with different filtering characteristics can be used in other embodiments to achieve other colors of light, and the present invention should not be limited to only filtering the spectral portions as described above to achieve a warmer light. For instance, other filters could be used to filter out other spectral portions to provide a light with a cooler temperature than the approximate 2700K provided by the white source described above. Other filters can filter different percentages of the spectral portions to achieve the desired color temperature. It is also understood that the filters according to the present invention can have different filtering characteristics in different regions, and that lamps according to the present invention can have more than one filter.

As discussed above, an aspect of the present invention is providing filtered light at a particular color temperature that retains the CRI substantially the same as or close to the CRI of light that is being filtered. In some embodiments, the CRI of the filtered light should be at approximately 70% or more of the light source CRI. In other embodiments the CRI of the filtered light should be approximately 80% or more of the light source CRI. In still other embodiments, the CRI should approximately 90% or more of the light source CRI, and in others it should be approximately 95% or more of the light source CRI. In some embodiments according to the present invention, the CRI of the filtering light should be approximately 80 or higher. In still other embodiments, the CRI should be approximately 85 or higher, and in other embodiments it should be approximately 90 or higher. Still in other embodiments, the CRI should be approximately 95 or higher.

Other aspects of the present invention are directed to providing warm color temperatures from a white light source, although it is understood that the present invention can be used to provide cooler temperatures. In some embodiments, the color temperature of the filtered light can be approximately 1700K or greater, while in other embodiments the filtered light can have a color temperature of approximately 2000K or greater. In still other embodiments it can have a color temperature of 2400 or greater.

Figure 3:
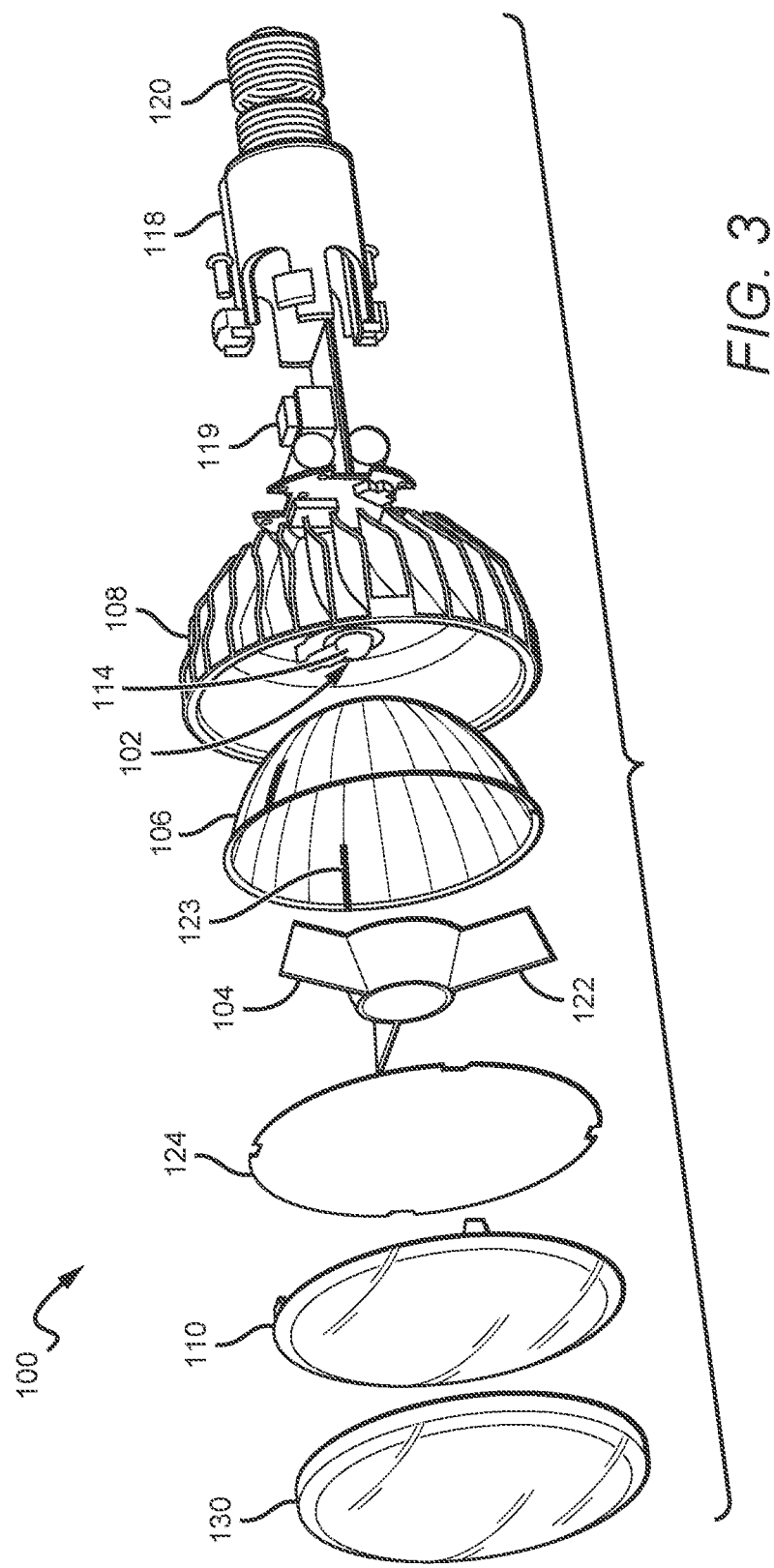
FIG. 3 is an exploded view of one embodiment of lamp according to the present invention.

As mentioned above, filters according to the present invention can be arranged in many different locations beyond that shown in FIGS. 2 and 3. FIG. 15 shows another embodiment of a lamp 260 according to the present invention that has many of the features and components as the lamp 100 in FIGS. 2 and 3. For those same or similar features, the same reference numbers will be used. For lamp 260, the filter 262 is mounted behind the lens on the inside of the lamp housing 108. In the embodiment shown the filter 262 can be mounted to the outer reflector 106, using any number of conventional mounting means such as bonding or mechanical means such as screws, clips, brackets, etc. It is understood that the filter can be mounted to other features within the lamp 200, such as the intermediate reflector (shown as 104 in FIG. 3) if one is included or to the back of the lens 110. The filter 262 can comprise conventional filters mentioned above such as the absorbing filters or reflecting dichroic filters and can have the lens properties and different arrangements discussed above. In particular it is understood that the filter 262 can cover less than the entire lamp opening so that less than all light emitting from the light source 102 passes through the filter 262. Such a filter configuration is shown in FIG. 20, where the filter 130' does not cover all of the opening.

FIG. 16 shows another embodiment of a lamp 300 according to the present invention comprising a filter dome or cover 302 over the light source 102, with the filter dome 302 arranged such that light from the light source 102 passes through the filter dome 302. The filter dome 302 can also comprise an absorbing or reflecting filter such as those described above, and can have the filtering characteristics described above to provide the desired color temperature and CRI. Although the dome 302 is shown with a space between it and the top surface of the light source, it is understood that the dome 302 can be mounted or formed directly on the light source 102. It is also understood that different dome 302 embodiments can be arranged so that less than all of light from light source passes through it.

FIG. 17 shows still another embodiment of a lamp 400 according to the present invention comprising a filtering colorant mixed in the encapsulant 402 of the light source 102 FIG. 18 shows still another embodiment of a lamp 500 according to the present invention comprising a filtering colorant mixed in the lens 502. For both these embodiments, the filtering provided by these colorants can comprise an absorbing type material that absorbs all or some of spectral portions from the light source, while allowing others to pass. The filtering colorant in the encapsulant and lens can also be arranged such that less than all of the light from the light source 102 passes through a colorant and is filtered.

As discussed above, the present invention is not limited to solid state lamps, but can also be used for other solid state lighting devices such as LED chips and LED packages. FIG. 19 shows one embodiment of an LED package 600 according to the present invention having a submount 602 with an LED array 604 mounted to the submount 602. The LEDs in the array 604 can electrically coupled together in one or more series circuits such that the LED array emits light in response to one or more electrical signals. The LED array 604 is covered by a lens shaped encapsulant 606. In this embodiment, a filter 608 is provided on the encapsulant 604, with the filter 608 having any of the characteristics described above. The filter 608 is arranged such that light from the light source passes through it, with the filter 608 filtering out all or some of one or more spectral portions to achieve the desired color temperature and CRI.

Other embodiments of LED chips and packages can be arranged in many different ways. In other LED package embodiments, the filtering colorant can be mixed in the encapsulant, and in still other embodiments a filtering dome can be mounted to the package with a space between the encapsulant and the filter. In still other embodiments, a planar filter can be mounted over the package with some or all of the package light passing through the filter.

The lamps and LED components arranged according to the present invention can be used for many different lighting applications. Some of these include but are not limited to residential, commercial, retail and street lighting. The embodiments can also be incorporated into any number and variety of other systems requiring a reliable and uniform light source.

Although the present invention has been described in detail with reference to certain preferred configurations thereof, other versions are possible. Therefore, the spirit and scope of the invention should not be limited to the versions described above.

FIG. 20 shows another embodiment of a filter according to the present invention comprising a plate 131 with the filter 130'. As shown in FIGS. 2 and 15, the plate 131 comprising the filter 130' can be placed in various positions.

We claim:

1. A light emitting diode (LED) lamp comprising:
   a LED light source configured to generate light emissions comprising an emission spectrum;
   a lamp opening configured to transmit at least a portion of the emission spectrum generated by the LED light source; and
   a filter configured to filter at least a portion of the emission spectrum
   wherein the light emitted from the LED light source has a color temperature of 2700K or higher, and wherein the filtered LED light source light has a color temperature of 2500K or lower.

2. The LED lamp of claim 1, wherein said filter filters at least some of the emission spectrum.

3. The LED lamp of claim 1, wherein the LED light has a different color temperature but substantially the same CRI after passing through said filter.

4. The LED lamp of claim 1, wherein the filter filters at least some of one or more portions of said emission spectrum.

5. The LED lamp of claim 1, wherein said lamp opening is in a lamp housing and wherein the filter is mounted to the inside of said housing.

6. The LED lamp of claim 1, wherein said filter comprises a dome at least partially covering said LED light source.

7. The LED lamp of claim 1, wherein said LED light source light has a color temperature of 1700K or higher after passing through said filter.

8. The LED lamp of claim 1, wherein the color rendering index (CRI) of the LED light source light after passing through the filter is 70% or more of the CRI of said LED light source light before filtering.

9. The LED lamp of claim 1, wherein the color rendering index (CRI) of the LED light source light after passing through the filter is 90% or more of the CRI of said LED light source light before filtering.

10. The LED lamp of claim 1, wherein said CRI of the LED light source light is 80 or more after passing through said filter.

11. The LED lamp of claim 1, wherein said light source light has a color temperature of 2000K or higher after passing through said filter.

12. The LED lamp of claim 1, wherein a color point of the light emitted from the LED light source is within 7 MacAdam ellipses of the black body locus and where a color point of the filtered LED light source light is also within 7 MacAdam ellipses of the black body locus.

13. The LED lamp of claim 1, wherein a color point of the light emitted from the LED light source is within 3 MacAdam ellipses of the black body locus and where a color point of the filtered LED light source light is also within 3 MacAdam ellipses of the black body locus.

14. The LED lamp of claim 1, wherein said emission spectrum comprises a blue portion and a green/yellow portion, said filter filtering at least some of a blue portion of said emission spectrum and at least some of a green/yellow portion of said spectrum.

15. The LED lamp of claim 14, wherein said filtered LED light source light has a lower color temperature but substantially the same CRI after passing through said filter.

16. The LED lamp of claim 14, wherein said filter filters approximately 40% of said blue portion and approximately 20% of said green/yellow portion.

17. The LED lamp of claim 14, wherein said filter filters approximately 90% of said blue portion and approximately 45% of said green/yellow portion.

18. A light emitting diode (LED) lamp comprising:
   a LED light source configured to generate light emissions comprising an emission spectrum;
   a lens positioned such that at least a portion of said LED light emissions passes through said lens; and
   a filter adjacent to said lens to filter at least a portion of the emission spectrum;
   wherein said filter is fixed in place with respect to said lens;
   wherein the light emitted from the LED light source has a color temperature of 2700K or higher, and wherein the filtered LED light source light has a color temperature of 2500K or lower;
   wherein the filter comprises at least one of the following characteristics (a) and (b):
   (a) the filter covers less than the entire lens so that at least a portion of said light emissions are transmitted from said lamp without passing through the filter; and
   (b) the filter comprises different filtering characteristics in different regions.

19. The LED lamp of claim 18, wherein said filter provides different filtering characteristics in different areas of a beam emitted by the LED lamp.

20. A light emitting diode (LED) lamp comprising:
   a LED light source configured to generate light emissions comprising an emission spectrum;
   a lamp housing defining an opening configured to transmit at least a portion of the emission spectrum generated by the LED light source; and
   a filter configured to filter at least a portion of the emission spectrum;
   wherein said filter is fixedly connected to said lamp housing at said opening;
   wherein the light emitted from the LED light source has a color temperature of 2700K or higher, and wherein the filtered LED light source light has a color temperature of 2500K or lower; and
   wherein said filter is non-uniform with respect to position and provides different filtering characteristics in different regions of a beam emitted by the LED light source.

21. The LED lamp of claim 20, wherein the LED light has a different color temperature but substantially the same CRI after passing through said filter.

22. The LED lamp of claim 20, wherein said filter is mounted to the inside of said lamp housing.

23. The LED lamp of claim 20, wherein said LED light source light has a color temperature of 1700K or higher after passing through said filter.

24. The LED lamp of claim 20, wherein the color rendering index (CRI) of the LED light source light after passing through the filter is 70% or more of the CRI of said LED light source light before filtering.

25. The LED lamp of claim 20, wherein the color rendering index (CRI) of the LED light source light after passing through the filter is 90% or more of the CRI of said LED light source light before filtering.

26. The LED lamp of claim 20, wherein said CRI of the LED light source light is 80 or more after passing through said filter.

27. The LED lamp of claim 20, wherein said light source light has a color temperature of 2000K or higher after passing through said filter.

28. The LED lamp of claim 20, wherein a color point of the light emitted from the LED light source is within 7 MacAdam ellipses of the black body locus and where a color point of the filtered LED light source light is also within 7 MacAdam ellipses of the black body locus.

29. The LED lamp of claim 20, wherein a color point of the light emitted from the LED light source is within 3 MacAdam ellipses of the black body locus and where a color point of the filtered LED light source light is also within 3 MacAdam ellipses of the black body locus.

30. The LED lamp of claim 20, wherein said emission spectrum comprises a blue portion and a green/yellow portion, said filter filtering at least some of a blue portion of said emission spectrum and at least some of a green/yellow portion of said spectrum.

31. The LED lamp of claim 30, wherein said filtered LED light source light has a lower color temperature but substantially the same CRI after passing through said filter.

32. The LED lamp of claim 20, wherein said filter comprises a dichroic filter that at least partially reflects blue light to a phosphor.

33. The LED lamp of claim 32, wherein said phosphor at least partially covers said LED light source.

* * * * *